United States Patent [19]
Ohmi

[11] Patent Number: 5,636,193
[45] Date of Patent: Jun. 3, 1997

[54] METHOD AND APPARATUS FOR REDUCING VIBRATION ON A DISK SPINDLE MOTOR BY DETECTING THE VIBRATIONS AND CORRECTING THE MOTOR DRIVING SIGNAL ACCORDING TO THE DETECTED VIBRATION

[75] Inventor: Takao Ohmi, Kanagawa-ken, Japan

[73] Assignee: Kabushiki Kaisha Toshiba, Kawasaki, Japan

[21] Appl. No.: 338,096

[22] Filed: Nov. 9, 1994

[30] Foreign Application Priority Data

Nov. 9, 1993 [JP] Japan .................................. 5-279832
Sep. 14, 1994 [JP] Japan .................................. 6-246995

[51] Int. Cl.$^6$ .................................................. G11B 15/46
[52] U.S. Cl. .................... 369/53; 360/73.03; 360/73.01; 369/50; 318/611
[58] Field of Search ........................ 360/73.03, 73.01, 360/71, 69, 31, 77.04, 77.05, 78.09; 318/611, 631, 702, 823; 369/53, 54, 50

[56] References Cited

U.S. PATENT DOCUMENTS

| | | | |
|---|---|---|---|
| 4,876,491 | 10/1989 | Squires et al. | 318/138 |
| 5,202,616 | 4/1993 | Peters et al. | 318/254 |
| 5,235,264 | 8/1993 | Kaneda et al. | 360/73.03 X |
| 5,258,695 | 11/1993 | Vtenick et al. | 360/73.03 X |
| 5,296,790 | 3/1994 | Fincher | 318/560 |
| 5,319,290 | 6/1994 | Yoshino et al. | 318/254 |
| 5,412,809 | 5/1995 | Tam et al. | 360/73.03 |

FOREIGN PATENT DOCUMENTS 5-342786  12/1993  Japan .

Primary Examiner—Aristotelis Psitos
Assistant Examiner—Larry T. Cullen
Attorney, Agent, or Firm—Foley & Lardner

[57] ABSTRACT

A method and an apparatus for recording and reproducing data on disk recording medium, capable of effectively reducing the unnecessary vibration of the spindle motor and the noises associated with it, and improving the tracking characteristic of a head with respect to the vibration of the spindle motor. The apparatus includes a head for recording and producing data with respect to a disk recording medium; a rotational driving mechanism including a spindle motor for driving the disk recording medium in rotation according to a driving waveform; and a waveform correction unit for detecting a vibration of the rotational driving mechanism and correcting the driving waveform supplied to the rotational driving mechanism according to the detected vibration. The apparatus can further includes a head driving mechanism for driving the head in a radial direction of the disk recording medium according to a driving signal; and a driving signal correction unit for correcting the driving signal supplied to the head driving mechanism according to the vibration of the rotational driving mechanism.

14 Claims, 6 Drawing Sheets

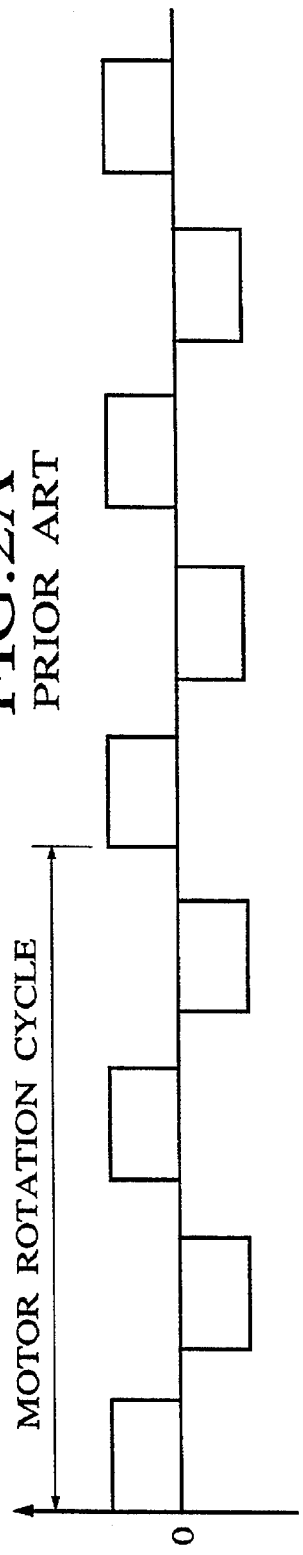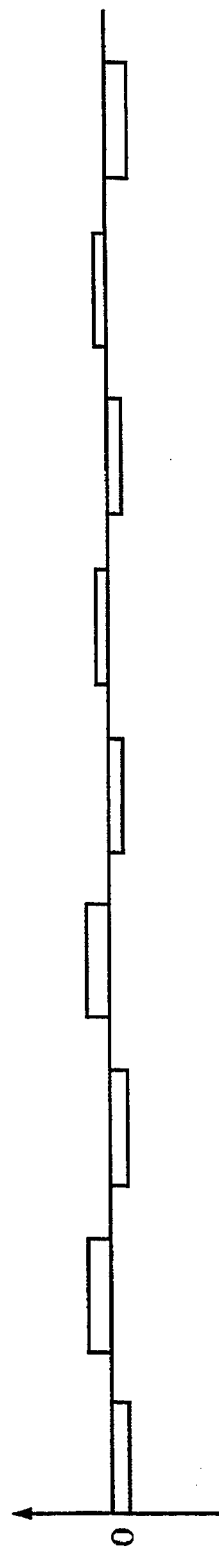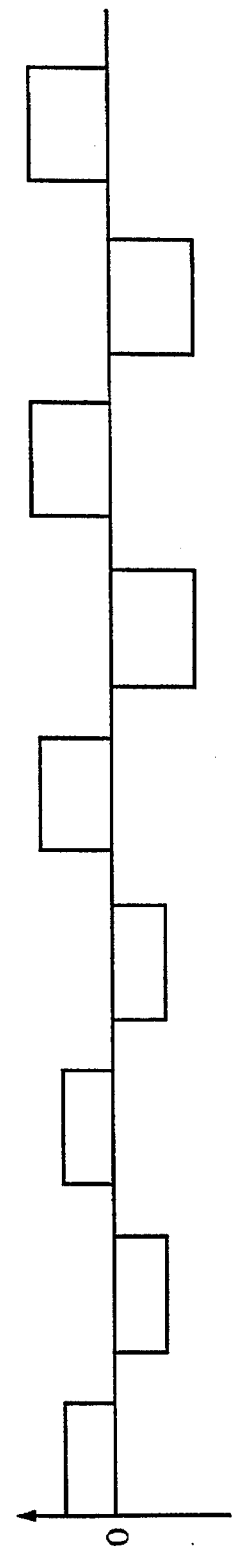

1

METHOD AND APPARATUS FOR REDUCING VIBRATION ON A DISK SPINDLE MOTOR BY DETECTING THE VIBRATIONS AND CORRECTING THE MOTOR DRIVING SIGNAL ACCORDING TO THE DETECTED VIBRATION

BACKGROUND OF THE INVENTION

1. Field of the Invention

The present invention relates to the recording and reproducing of data on a disk recording medium such as a magnetic disk or an optical disk, and more particularly, to a driving control of a spindle motor for rotating the recording medium.

2. Description of the Background Art

Conventionally, in an apparatus for recording data by using a disk recording medium such as a hard disk drive, it is customary to drive the spindle motor for rotating the disk by switching driving currents, and to carry out the servo control for maintaining a constant rotational speed of the spindle motor by detecting an error with respect to a target rotational speed and changing a driving waveform of the motor, i.e., a pulse width or an amplitude of a driving current waveform of the motor, according to the detected error. By means of this servo control, it is possible to drive the spindle motor at the rotation precision satisfying the required device specification.

However, in this type of a conventional spindle motor driving mechanism, while it is possible to suppress the variation of the rotational speed around the axis of the spindle motor sufficiently by means of the above described servo control, it is impossible to suppress the vibration such as the so called axial vibration occurring in a direction other than that around the axis of the spindle motor, and the servo control for stabilizing the rotational speed actually has a side-effect to promote the vibration of the spindle motor and the generation of noises.

This vibration of the spindle motor has an adverse effect especially on the tracking characteristic of a magnetic head in the magnetic disk device realizing a high recording density due to a high track density, and in addition, it also causes the spike noises which lower the C/N (Carrier to Noise) ratio of the reproduced signals.

This vibration of the spindle motor can be reduced by improving the mechanical precision of the motor components, by improving the manufacturing precision of the motor or the bearing for example, but it is impossible to remove this vibration of the spindle motor completely by the improvement of the mechanical precision alone.

Moreover, even if it is possible to reduce this vibration of the spindle motor by the improved mechanical precision initially, this vibration of the spindle motor would increase as time elapses because of the deterioration of the mechanical precision such as the wear of the bearing. In addition, the improvement of the mechanical precision further than what is required by the device specification, solely for the purpose of reducing this vibration of the spindle motor, would require a considerable increase of the device cost which is commercially quite disadvantageous.

SUMMARY OF THE INVENTION

It is therefore an object of the present invention to provide a method and an apparatus for recording and reproducing data on disk recording medium, capable of effectively reducing the unnecessary vibration of the spindle motor and the noises associated with it.

It is another object of the present invention to provide a method and an apparatus for recording and reproducing data on disk recording medium, capable of improving the tracking characteristic of a head with respect to the vibration of the spindle motor, and thereby extending the lifetime of the apparatus.

According to one aspect of the present invention there is provided an apparatus for recording and reproducing data, comprising: head means for recording and producing data with respect to a disk recording medium; rotational driving mechanism including a spindle motor for driving the disk recording medium in rotation according to a driving waveform; and waveform correction means for detecting a vibration of the rotational driving mechanism and correcting the driving waveform supplied to the rotational driving mechanism according to the detected vibration.

According to another aspect of the present invention there is provided a method of recording and reproducing data, comprising the steps of: (a) recording and producing data with respect to a disk recording medium through head means; (b) driving the disk recording medium in rotation according to a driving waveform by a rotational driving mechanism including a spindle motor; and (c) detecting a vibration of the rotational driving mechanism and correcting the driving waveform supplied to the rotational driving mechanism according to the detected vibration.

Other features and advantages of the present invention will become apparent from the following description taken in conjunction with the accompanying drawings.

BRIEF DESCRIPTION OF THE DRAWINGS

FIGS. 2A to 2C are waveform diagrams for explaining an operation in a conventional spindle motor driving circuit.

DETAILED DESCRIPTION OF THE PREFERRED EMBODIMENTS

Figure 1:
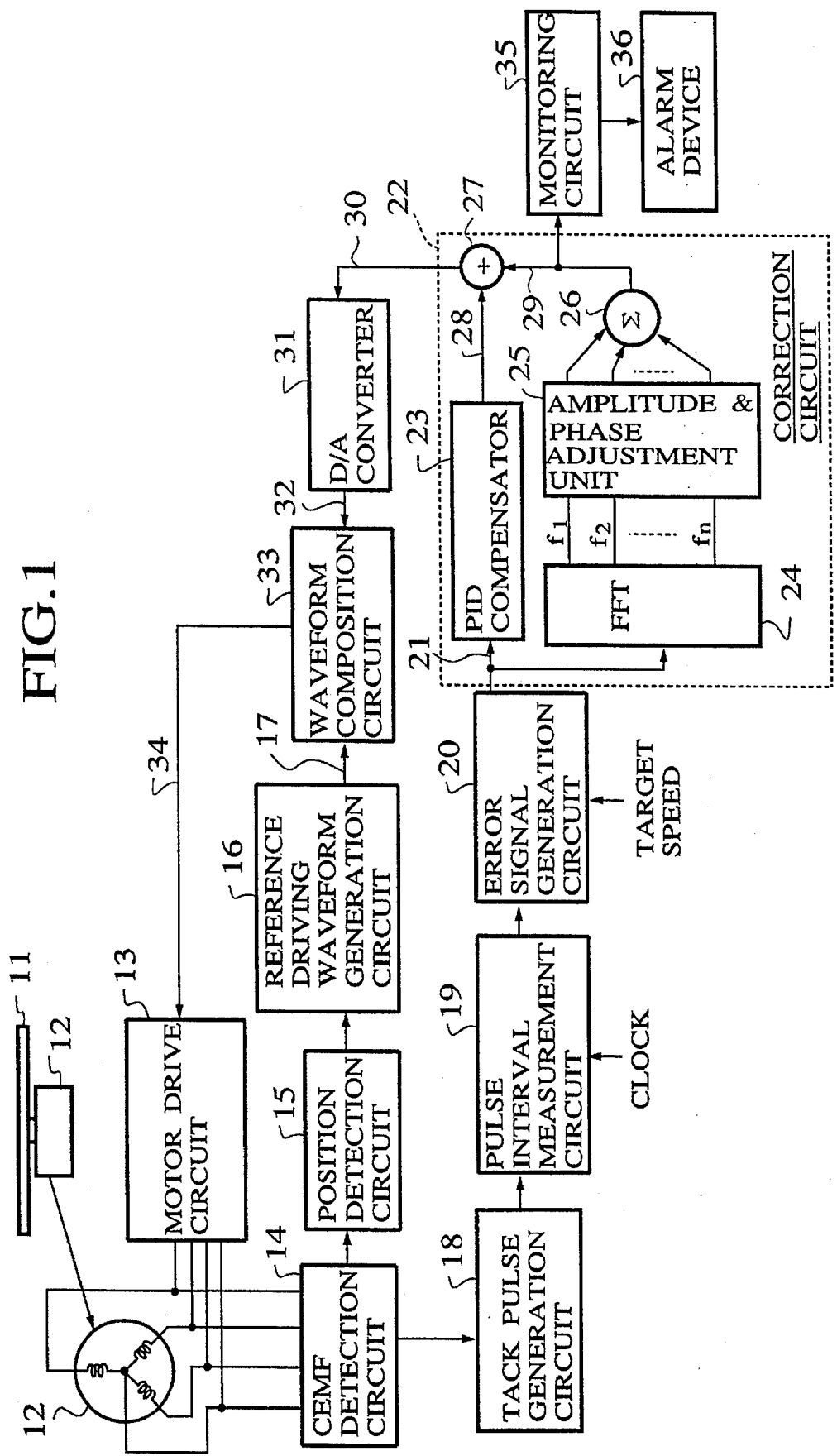
FIG. 1 is a block diagram of a first embodiment of an apparatus for recording and reproducing data on disk recording medium according to the present invention.

Referring now to FIG. 1, a first embodiment of an apparatus for recording and reproducing data on disk recording medium according to the present invention will be described in detail. This first embodiment concerns with an exemplary case in which the apparatus is given in a form of a magnetic disk apparatus having a configuration as shown in FIG. 1.

This configuration of FIG. 1 incorporates a magnetic disk 11 such as a hard disk which is driven into rotation by a spindle motor 12, and the recording and reproducing of data with respect to this magnetic disk 11 are carried out by a magnetic recording and reproducing head (not shown) of a usual type. In this embodiment, the spindle motor 12 is provided by a three phase motor which is driven by a motor drive circuit 18 according to a prescribed pulse shaped driving waveform. Here, the motor drive circuit 13 itself is of a usual type in a known configuration so that its explanation will be omitted.

The spindle motor 12 is connected with a counter electromotive force (CEMF) detection circuit 14 for detecting a waveform of a counter electromotive force generated at three phase coils due to the current or voltage waveform supplied into the three phase coils of the spindle motor 12 in conjunction with its rotation. The counter electromotive force detected by this CEMF detection unit 14 is then supplied to a position detection circuit 15 and a tack pulse generation circuit 18.

The position detection circuit 15 detects prescribed rotational positions (rotational phases) of the spindle motor 12 from the supplied counter electromotive force, and outputs position data indicating detected rotational positions to a reference driving waveform generation circuit 16. In response, the reference driving waveform generation circuit 16 generates a reference driving waveform 17 according to the entered position data, which forms a basis of a driving waveform 34 to be supplied from the motor drive circuit 13 to the spindle motor 12.

On the other hand, the tack pulse generation circuit 18 shapes the counter electromotive force waveform detected by the CEMF detection circuit 14 into pulses to generate tack pulses (rotational phase signals) synchronized with the rotation of the spindle motor 12. Here, the tack pulses refer to a serial pulse train output of angular position sensing system using CEMF, head output, optical encoder output, etc., which is also referred to as the commutation output frequency. In this case, about ten or so pulses are generated in series per each rotation of the spindle motor 12 for example. It is to be noted that the above described position detection circuit 15 may also be given in a configuration similar to that of this tack pulse generation circuit 18, and in which case it is also possible to provide a single circuit commonly for the position detection circuit 15 and the tack pulse generation circuit 18 of FIG. 1.

The tack pulses generated by the tack pulse generation circuit 18 are then supplied to a pulse interval measurement circuit 19 for measuring a pulse interval, i.e., a time interval between successive pulses. This pulse interval measurement circuit 19 comprises a counter for example, and outputs a digital value corresponding to the pulse interval by resetting the counter whenever the generation of the tack pulses is detected and counting clocks with a period sufficiently shorter than that of the tack pulses. This pulse interval corresponds to the rotational speed of the spindle motor 12 such that the pulse interval decreases as the rotational speed becomes faster, and the pulse interval increases as the rotational speed becomes slower.

The digital value indicating a change of the counter value corresponding to the pulse interval of the tack pulses measured by the pulse interval measurement circuit 19 is then supplied to an error signal generation circuit 20, to which a digital value indicating a predetermined target speed for the rotational speed of the spindle motor 12 is also supplied. The error signal generation circuit 20 obtains a difference of these supplied digital values and outputs an error signal 21 given by a digital value corresponding to the obtained difference which indicates a rotational speed error for the spindle motor 12. In this embodiment, the digital value corresponding to the target speed is set in advance to a value corresponding to the pulse interval of the tack pulses obtained when the spindle motor 12 is rotated at the same speed as the target speed, by a system controller or reference synchronization generation device (not shown) which controls the operation of the magnetic disk apparatus as a whole for example. Consequently, the error signal 21 outputted from the error signal generation circuit 20 indicates the error of the rotational speed of the spindle motor 12 with respect to the target speed.

This error signal 21 outputted from the error signal generation circuit 20 is then supplied to a correction circuit 22 formed by a DSP (Digital Signal Processor) for example. This correction circuit 22 functionally comprises a PID (Proportional Integral and Differential) compensator 23, an FFT (Fast Fourier Transform unit) 24, an amplitude and phase adjustment unit 25, a summation unit 26, and an adder 27.

Here, the PID compensator 23 is a compensating filter usually used in the servo control system in general, which generates a first correction signal 28 for correcting the rotational speed of the spindle motor 12 according to the input of the error signal 21.

The FFT 24 carries out the frequency analysis with respect to the error signal 21, and outputs a plurality of frequency components f1, f2,—, fn. These frequency components include those corresponding to the vibration such as the axial vibration of the spindle motor 12 which are contained in the error signal 21.

The amplitude and phase adjustment unit 25 separately adjusts the amplitude and the phase of each frequency component extracted by the FFT 24. The summation unit 26 sums up n pieces of output signals of the amplitude and phase adjustment unit 25 to generate a second correction signal 29 for suppressing an influence of the vibration of the spindle motor 12, while the adder 27 adds the first correction signal 28 obtained by the PID compensator 23 and the second correction signal 29 obtained by the summation unit 26 to obtain a composite correction signal 30 as an output of the correction circuit 22.

The composite correction signal 30 outputted by the adder 27 as an output of the correction circuit 22 is then converted into an analog value by a D/A converter 31 to form a correction waveform 32. This correction waveform 32 is then composed together with the reference driving waveform 17 generated by the reference driving waveform generation circuit 16 by a waveform composition circuit 33, to obtain a final corrected driving waveform 34 to be supplied to the motor drive circuit 13.

Next, the operation in this apparatus of FIG. 1 will be described.

When the spindle motor 12 rotates, according to the variation of its rotational speed around its axis, the pulse interval of the tack pulses generated at the tack pulse generation circuit 18 changes. Here, when the vibration in the direction other than that around the axis of the spindle motor 12 occurs, the pulse interval of the tack pulses also varies according to this vibration, and this variation part in the tack pulse interval due to the vibration of the spindle motor 12 also appears in the error signal 21 outputted from the error signal generation circuit 20 through the pulse interval measurement circuit 19. The frequency components of this vibration part contained in the error signal 21 generally differ from the normal rotational frequency components of the spindle motor 12 which are determined by the target speed, and contain frequency components which are either lower or higher than normal. By utilizing this fact, these frequency components of the vibration part are detected at the correction circuit 22.

To this end, the error signal 21 outputted from the error signal generation circuit 20 is supplied to the correction circuit 22, and the first correction signal 28 for correcting the rotational speed of the spindle motor 12 is obtained by the PID compensator 23, while the second correction signal 29 for suppressing the effect of the vibration of the spindle motor 12 is obtained by the FFT 24, the amplitude and phase adjustment unit 25, and the summation unit 26. Then, the adder 27 obtains the composite correction signal 30 by adding the first and second correction signals 28 and 29 together such that the vibration part contained in the first correction signal 28 is suppressed by the second correction signal 29.

Namely, the FFT 24 carries out the frequency analysis of the error signal 21 to extract the frequency components f1, f2, —, fn containing the frequency components of the vibration part. Then, the amplitude and phase adjustment unit 25 adjusts the amplitude and the phase of each frequency component separately such that the amplitude and the phase of each frequency component of the vibration part are adjusted to be the same amplitude but the opposite phase as the original frequency component of the vibration part. Consequently, the second correction signal 29 has the same amplitude but the opposite phase of the vibration part contained in the first correction signal 28, so that when they are added together at the adder 27, the vibration part contained in the first correction signal 28 is cancelled out by the second correction signal 29 and the composite correction signal 30 reflects the variation of the rotational speed of the spindle motor 12 around its axis alone.

This composite correction signal 30 is then converted into the correction waveform 32 at the D/A converter 31, and composed together with the reference driving waveform 17 obtained by the reference driving waveform generation circuit 16 at the waveform composition circuit 33 to produce the corrected driving waveform 34 in which the vibration part of the spindle motor 12 is suppressed. Consequently, by supplying this corrected driving waveform 34 to the motor drive circuit 13, it is possible to reduce the vibration of the spindle motor 12 so as to realize a stable constant speed rotation of the spindle motor 12.

Here, the difference between this first embodiment of FIG. 1 and the conventional magnetic disk apparatus can be illustrated as follows.

FIGS. 2A, 2B, and 2C illustrate the waveforms used in the conventional magnetic disk apparatus, where FIG. 2A shows a reference driving waveform, FIG. 2B shows a correction waveform for correcting the variation of the rotational speed of the spindle motor alone, and FIG. 2C shows a corrected driving waveform obtained by composing the reference driving waveform of FIG. 2A and the correction waveform of FIG. 2B. In this conventional case, all of the waveforms of FIGS. 2A, 2B, and 2C are in rectangular forms synchronized with the tack pulse period or the switching period, and only the amplitude in the corrected driving waveform of FIG. 2C is corrected according to the variation of the rotational speed of the spindle motor.

Figure 3A:
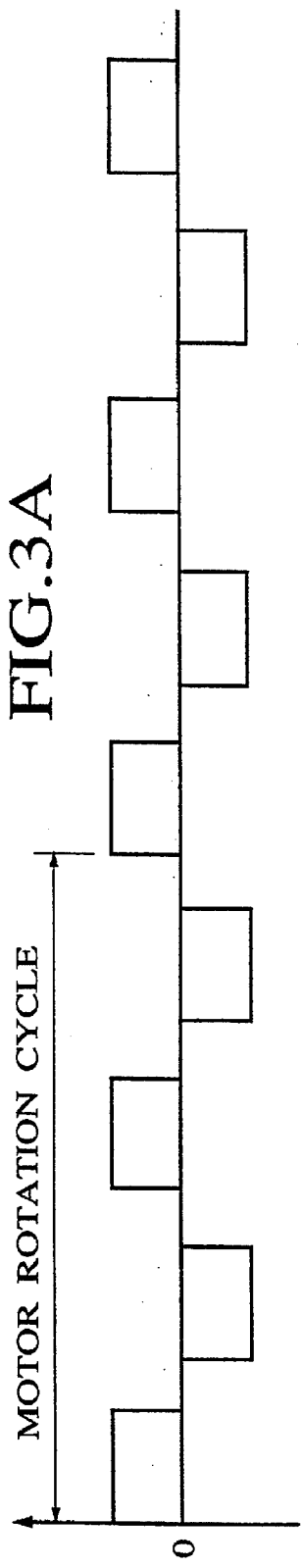
FIGS. 3A to 3C are waveform diagrams for explaining an operation of a spindle motor driving circuit in the apparatus for recording and reproducing data on disk recording medium according to the present invention.
Figure 3B:
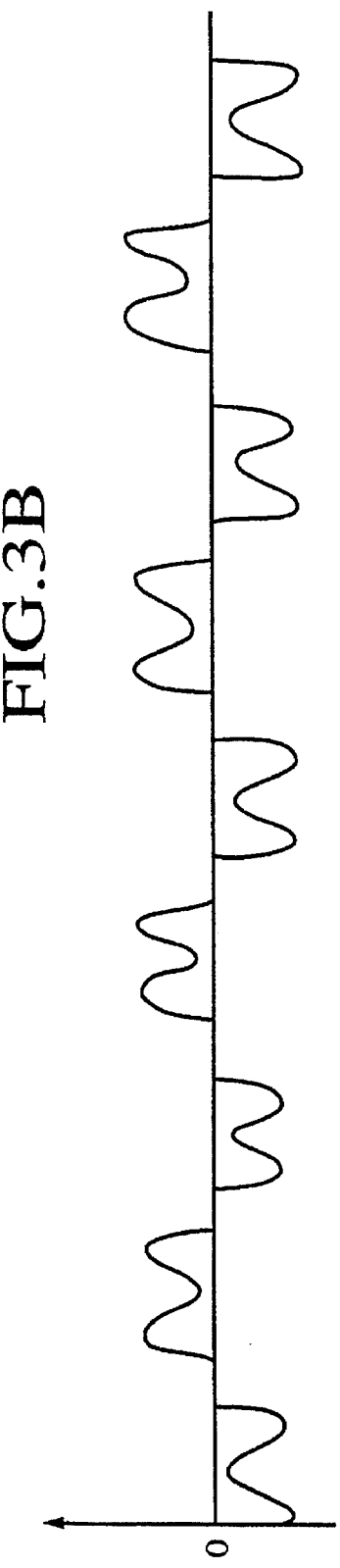
Figure 3C:
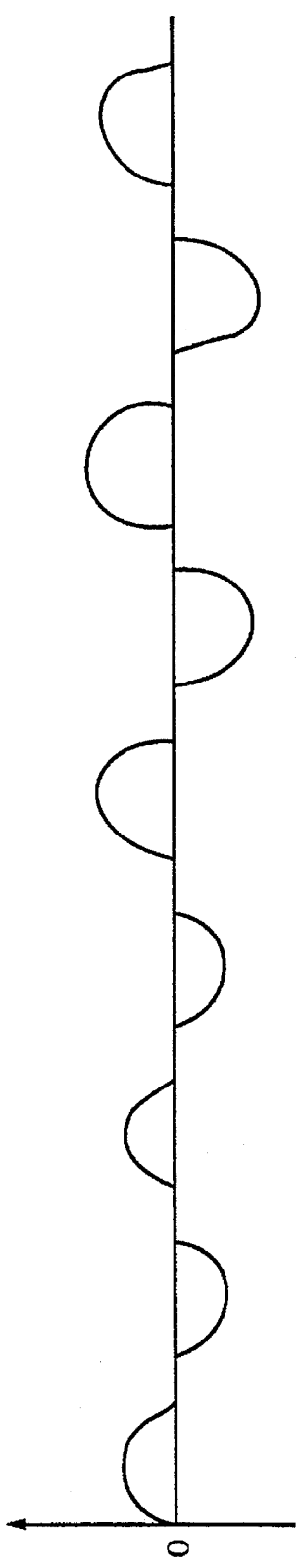

In contrast, FIGS. 3A, 3B, and 3C illustrate the waveforms used in the first embodiment of FIG. 1, where FIG. 3A shows the reference driving waveform 17, FIG. 3B shows the correction waveform 32, and FIG. 3C shows the corrected driving waveform 34 obtained by composing the reference driving waveform 17 of FIG. 3A and the correction waveform 32 of FIG. 3B. Here, the correction waveform 32 suppresses the vibration of the spindle motor 12 in addition to correct the rotational speed of the spindle motor 12, so as to stabilize the rotation of the spindle motor 12. In this case, the reference driving waveform 17 of FIG. 3A is in a rectangular form as it is generated at the switching timing for the switching of the phase in the spindle motor 12, but the correction waveform 32 of FIG. 3B has a complicated waveform as it contains components for suppressing the vibration of the spindle motor 12 in addition to the components synchronized with the rotational frequency f, i.e., FIG. 3B has a waveform that can be expressed as a superposition of suitably selected ones of frequency components nf and (1/n)f, where n is a positive integer. Consequently, the corrected driving waveform of FIG. 3C has the amplitude corrected according to the variation of the rotational speed of the spindle motor 12 and the shape of the waveform deformed in order to suppress the vibration of the spindle motor 12. Thus, by supplying the driving currents from the motor drive circuit 13 to the spindle motor 12 according to this corrected driving waveform of FIG. 3C, it is possible to suppress the unnecessary vibration of the spindle motor 12 effectively.

Moreover, in this first embodiment, the vibration part of the spindle motor 12 is detected by utilizing the fact that this vibration part is contained in the error signal 21 indicating the rotational speed error of the spindle motor 12 obtained by the rotational speed servo control system, so that there is no need to provide a specific means for detecting the vibration of the spindle motor 12 solely for that purpose and the apparatus configuration can remain quite simple.

In this first embodiment, as shown in FIG. 1, it is also possible to provide a monitoring circuit 35 connected with the correction circuit 22 and an alarm device 36 connected with the monitoring circuit 35. Here, the monitoring circuit 35 makes sampling of the amplitude of the second correction signal 29 obtained as the output of the summation unit 26 in the correction circuit 22, so as to monitor the time change of the vibration part of the spindle motor 12, and supplies an abnormality detection signal to the alarm device 36 whenever the sampled time change exceeds a prescribed tolerable level. In response, the alarm device 36 makes an alarm display indicating the occurrence of an abnormality, stops the operation of the magnetic disk apparatus, or transfers the abnormality detection signal to the other elements of the magnetic disk apparatus so as to notify the occurrence of the abnormality to the user.

Here, the sampling of the amplitude of the second correction signal 29 by the monitoring circuit 35 may be carried out at constant time intervals, or at a start of each use of the magnetic disk apparatus. In the former case, the change of the vibration of the spindle motor 12 per constant period of time is going to be monitored, whereas in the latter case, the change of the vibration of the spindle motor 12 with respect to the previous usage is going to be monitored.

It is also possible to modify this configuration of FIG. 1 further such that the time change of the vibration of the spindle motor 12 is monitored by sampling the other signal containing the vibration part of the spindle motor 12 instead of or in addition to the second correction signal 29. It is also possible to provide a warning of a lifetime or a malfunction of the apparatus according to the monitored second correction signal 29.

It is also possible to modify the above described first embodiment such that the reference driving waveform 17 and the correction waveform 32 are composed together by using appropriate weight factors at the waveform composition circuit 33. For instance, the correction waveform 32 alone or both the correction waveform 32 and the reference driving waveform 17 may be passed through amplifiers with either fixed or variable gain filter. In a case of using the variable gain amplifier, it is possible to adjust the amplitude gain, so that the degree of freedom in deforming the driving waveform can be increased and the quick suppression of the vibration can be realized by using the appropriate gain setting. In addition, it is also possible to enhance the applicable driving range so that it becomes possible to deal with the faster motor rotation, the higher torque driving, the larger vibration due to the external disturbance, the larger rotational speed variation, etc. In such a case, the setting of the variable gain and the filter constant can be made in an adaptive manner by the learning from the change of the error signal using the DSP for example.

Next, referring to FIG. 4, a second embodiment of an apparatus for recording and reproducing data on disk recording medium according to the present invention will be described.

Figure 4:
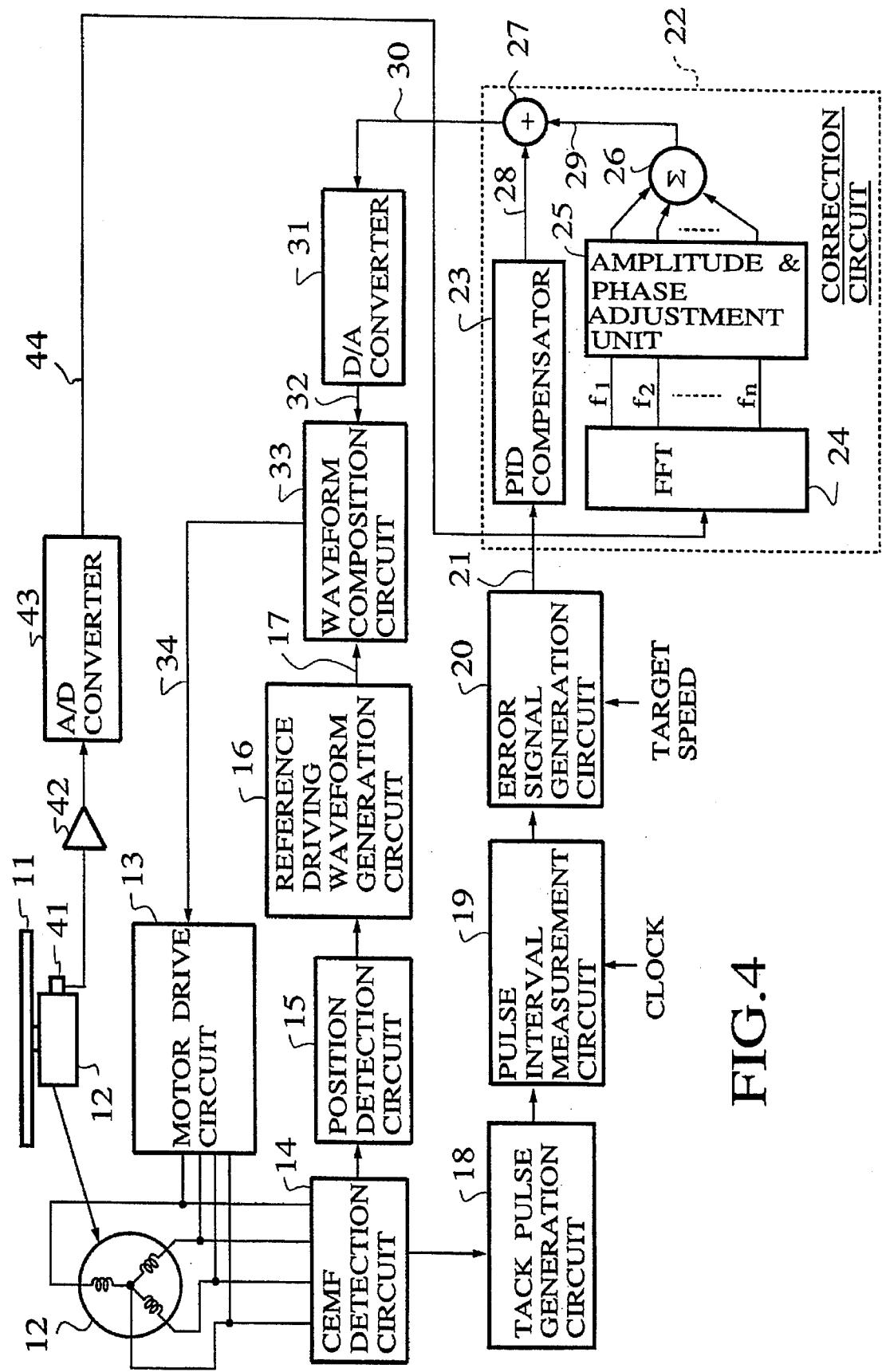
FIG. 4 is a block diagram of a second embodiment of an apparatus for recording and reproducing data on disk recording medium according to the present invention.

This second embodiment of FIG. 4 differs from the first embodiment of FIG. 1 described above in that it incorporates a vibration detector 41 attached to the spindle motor 12 for directly detecting the vibration part of the spindle motor 12. This vibration detector 41 comprises an acceleration pick up device formed by a piezoelectric element for example, which outputs an electrical signal corresponding to the vibration part of the spindle motor 12. The detection signal obtained by this vibration detector 41 is then amplified by an amplifier 42, and converted into a digital signal by an A/D converter 43 as a vibration part detection signal 44 which is supplied to the FFT 24 of the correction circuit 22 instead of the error signal 21 supplied to the FFT 24 in the first embodiment.

In the correction circuit 22, the frequency components of this vibration part detection signal 44 are analyzed and extracted by the FFT 24. Then, just as in the first embodiment, the amplitude and the phase of each frequency component are separately adjusted by the amplitude and phase adjustment unit 25, the outputs of the amplitude and phase adjustment unit 25 are summed up by the summation unit 26, and the first correction signal 28 obtained by the PID compensator 23 and the second correction signal 29 obtained by the summation unit 26 are added together by the adder 27 to produce the composite correction signal 30.

Thus, it should be apparent that the similar effects as in the first embodiment described above are obtainable in this second embodiment as well.

It is to be noted that this vibration detector 41 may not necessarily be directly attached to the spindle motor 12 as shown in FIG. 4, and can be provided at any position at which the vibration of the spindle motor 12 can be detected, such as that in a vicinity of the spindle motor 12, or that between the spindle motor 12 and a head actuator (not shown).

Next, referring to FIG. 5, a third embodiment of an apparatus for recording and reproducing data on disk recording medium according to the present invention will be described.

Figure 5:
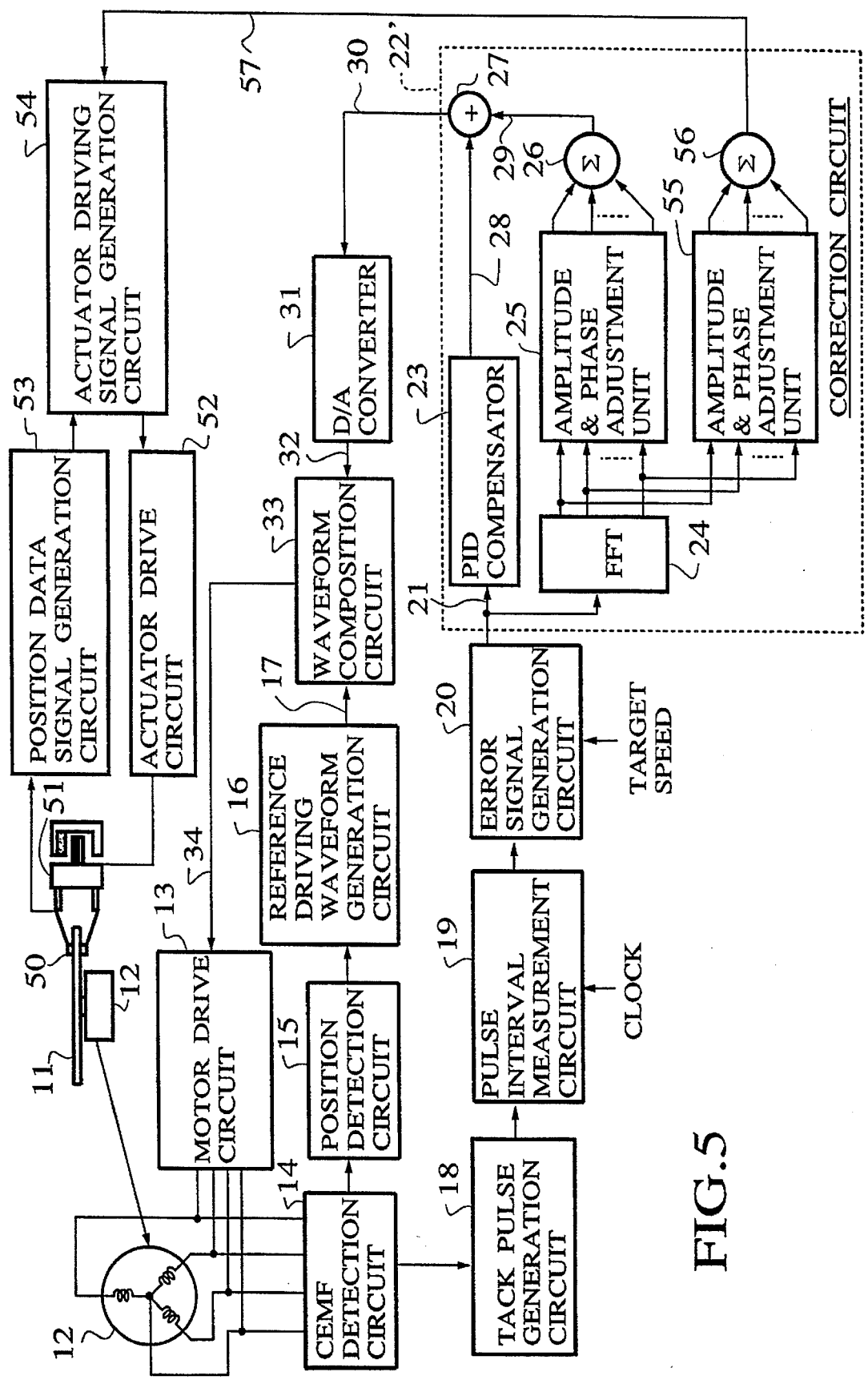
FIG. 5 is a block diagram of a third embodiment of an apparatus for recording and reproducing data on disk recording medium according to the present invention.

FIG. 5 shows a head system including a recording and reproducing head 50, a head actuator 51, an actuator drive circuit 52 for driving the head actuator 51, a position data signal generation circuit 53, and an actuator driving signal generation circuit 54, which has been omitted in FIGS. 1 and 4. Here, each of these elements of the head system by itself is of a usual type, so that they will be described only briefly.

The recording and reproducing head 50 is a magnetic head for recording data onto the magnetic disk 11 and reproducing data recorded on the magnetic disk 11 via a recording and reproducing circuit (not shown). Here, this recording and reproducing head 50 may be of any desired type including a unified head which uses a single magnetic head such as an induction type head for both recording and reproducing, or a composite head in which an induction type head as a recording head and an MR (Mechanical Recording) head as a reproducing head are integrally provided.

The head actuator 51 is a head actuating means which moves the recording and reproducing head 50 in a radial direction of the magnetic disk 11, which can be formed by a VCM (Voice Coil Motor) or a rotary actuator. The actuator drive circuit 52 is a circuit for supplying the driving currents with respect to the head actuator 51 according to the driving signals from the actuator driving signal generation circuit 54.

The position data signal generation circuit 53 is a circuit for processing the position signal indicating a position of the head 50 along the radial direction (track width direction) of the magnetic disk 11 according to the servo data reproduced from the magnetic disk 11 by the head 50. This position data signal is then supplied to the actuator driving signal generation circuit 54.

The actuator driving signal generation circuit 54 generates the driving signals to be supplied to the actuator drive circuit 52 for positioning the head 50 to a target track specified from a host system (not shown) according to the position data signal obtained by the position data signal generation circuit 53.

Now, in this head system, when there is a vibration in the spindle motor 12, the magnetic disk 11 inevitably also vibrate, so that the vibration part is also introduced into the position data signal of the head 50 obtained by the position data signal generation circuit 53 due to the vibration part of the magnetic disk 11 in the track width direction. Namely, the error is introduced into the position data signal due to the vibration of the magnetic disk 11 caused by the vibration of the spindle motor 12.

In order to remove the influence of this vibration part, in this third embodiment, the driving signals to be supplied from the actuator driving signal generation circuit 54 to the actuator drive circuit 52 are corrected according to the vibration part of the spindle motor 54, so as to realize the stable positioning of the head 50 without being influenced by the vibration of the spindle motor 12.

To this end, the correction circuit 22' of this third embodiment further includes another amplitude and phase adjustment unit 55 and another summation unit 56 similar to the amplitude and phase adjustment unit 25 and the summation unit 26. Namely, the frequency components of the vibration part extracted by the FFT 24 are supplied to this amplitude and phase adjustment unit 55 in addition to the amplitude and phase adjustment unit 25. Then, the amplitude and the phase of each frequency component are separately adjusted by this amplitude and phase adjustment unit 55, independently from the amplitude and phase adjustment unit 25, and the outputs of this amplitude and phase adjustment unit 55 are summed up by the summation unit 56 to produce a third correction signal 57 which is then supplied to the actuator driving signal generation circuit 54. The actuator driving signal generation circuit 54 then corrects the driving signals to be supplied to the actuator drive circuit 52 according to this third correction signal 57.

Here, the amplitude and the phase of each frequency component of the vibration part of the spindle motor 12 are adjusted by the amplitude and phase adjustment unit 55 to values for removing the influence of the vibration part of the spindle motor 12 from the position data signal obtained at the position data signal generation circuit 53 and generating the driving signals to place the head 50 at a correct position of the target track by the actuator driving signal generation circuit 54. Here, basically, the amplitude and phase adjustment unit 55 adjusts the amplitude and the phase of each frequency component separately such that the amplitude and the phase of each frequency component of the vibration part are adjusted to be the same amplitude and the same phase as the original frequency component of the vibration part as far as the vibration in the radial direction is concerned. As for the vibration in the rotational direction or the axial direction, the amplitude and phase adjustment unit 55 can either reduce the amplitude of each frequency component, or leave it unchanged. In practice, it is also necessary here to account for the fact that the state of the disk vibration at a time of controlling the head position is actually different from the state at which the disk vibration had been measured, as the spindle motor 12 is also controlled to reduce the disk vibration at the same time.

In this manner, in this third embodiment, it is possible to realize the stable positioning of the head 50 without being influenced by the vibration of the magnetic disk 11 associated with the vibration of the spindle motor 12.

Next, referring to FIG. 6, a fourth embodiment of an apparatus for recording and reproducing data on disk recording medium according to the present invention will be described.

Figure 6:
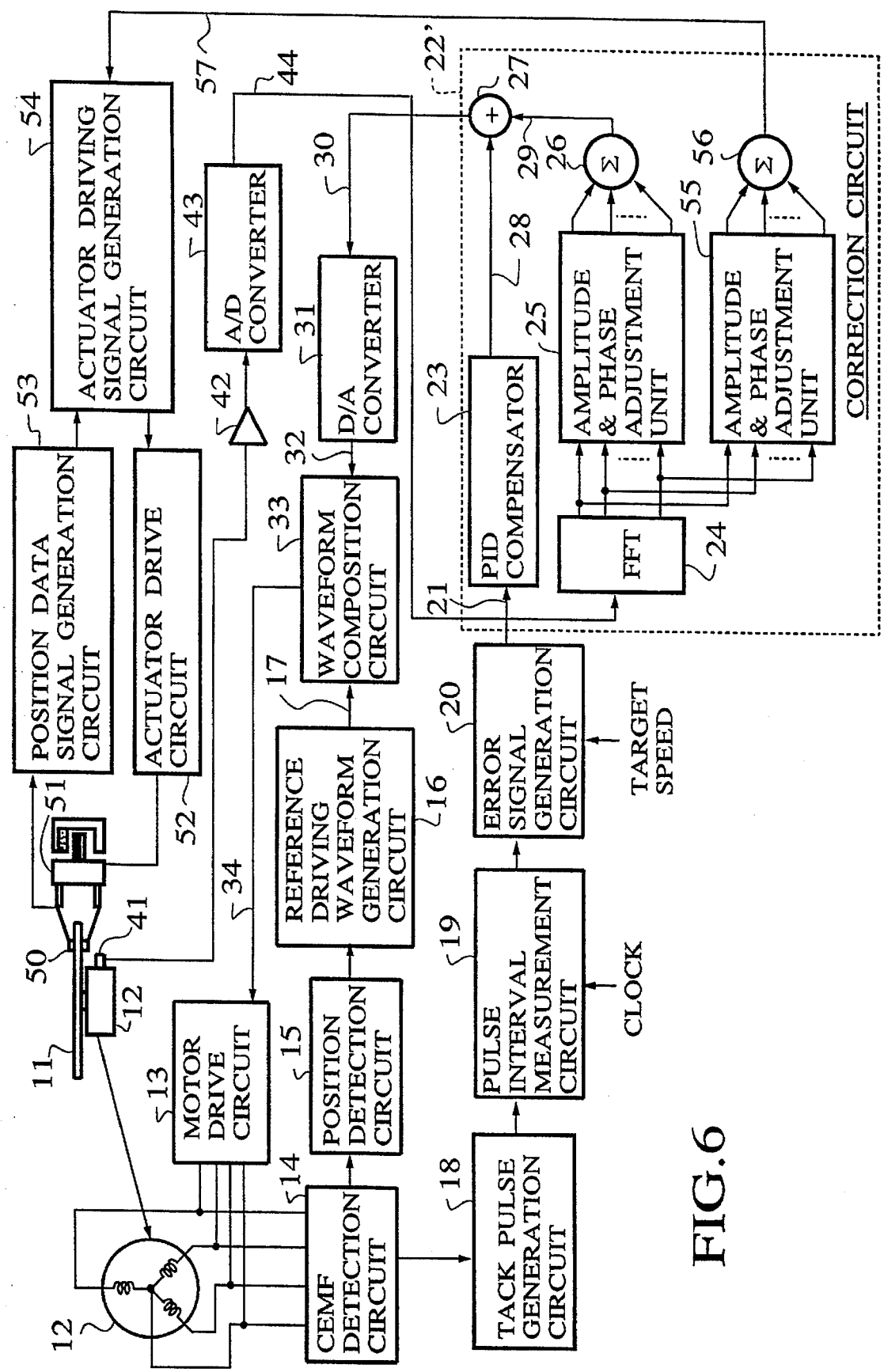
FIG. 6 is a block diagram of a fourth embodiment of an apparatus for recording and reproducing data on disk recording medium according to the present invention.

This fourth embodiment of FIG. 6 differs from the third embodiment of FIG. 5 described above in the same manner by which the second embodiment of FIG. 4 differs from the first embodiment of FIG. 1. Namely, it incorporates the vibration detector 41 attached to the spindle motor 12 for directly detecting the vibration part of the spindle motor 12, the amplifier 42 and the A/D converter 43 for producing the vibration part detection signal 44 which is supplied to the FFT 24 of the correction circuit 22' instead of the error signal 21 supplied to the FFT 24 in the third embodiment. In other words, this fourth embodiment is a hybrid of the second and third embodiments described above, and its features are substantially similar to those described above in FIGS. 4 and 5, so that their description will be omitted.

It should be quite apparent that the similar effects as in the third embodiment described above are obtainable in this fourth embodiment as well.

It is to be noted that there are many possible modifications to the embodiments described above as follows.

(1) In the embodiments described above, the tack pulses are generated by the waveform shaping of the output waveform of the CEMF detection circuit 14 at the tack pulse generation circuit 18, but it is also possible to use a rotary encoder in which an encoder plate and a photo coupler are combined, or a combination of a magnet and a magnetic field detection element such as the Hall element.

Moreover, it is also possible to replace this tack pulse generation circuit 18 by a supply to the pulse interval measurement circuit 19 of a disk rotational phase data obtained by the position data signal generation circuit 53 from the data recorded on the magnetic disk 11.

(2) In the embodiments described above, the second correction signal 29 for suppressing the vibration part is obtained through the amplitude and phase adjustment unit 28 and the summation unit 26 from a plurality of frequency components of the vibration part of the spindle motor 12 extracted by the FFT 24, but in a case it is possible to specify the frequency of the vibration part from a physical configuration of the apparatus, or in a case it is permissible to concentrate on a particular dominant frequency component among a number of frequency components of the vibration part, it is also possible to modify such that only a particular specified frequency component of the vibration part alone is extracted in obtaining the second correction signal 29.

(3) It is also possible to modify the manner of correcting the driving waveform of the spindle motor 12 such that time interval data containing the characteristic dependent on the apparatus such as the magnetization fluctuation in motor permanent magnet, the variation in geometrical arrangement of stator coil slots, and the driving scheme of the motor drive circuit 13 are stored in advance as the initial value in a ROM or a RAM or the magnetic disk 11 itself, and the correction value is determined according to a difference between the stored initial value and each measured value. Other than that, any suitable algorithm or means for correcting the driving waveform may be used as long as it is possible to detect the motor rotation synchronized vibration part among the frequency components that can be extracted from the time interval data, the resonant frequency component of the structure body such as the motor and the apparatus, and the vibration component characteristic to the ball bearing.

Similarly, the target speed used at the error signal generation circuit 20 of the above embodiments may not necessarily be given as a constant time interval signal, and can be given according to the time interval data containing the characteristic dependent on the apparatus such as the magnetization fluctuation in motor permanent magnet, the variation in geometrical arrangement of stator coil slots, and the driving scheme of the motor drive circuit 13 which are stored in advance in a ROM or a RAM or the magnetic disk 11 itself.

(4) The present invention is not just applicable to a case of the magnetic disk apparatus described above, and equally applicable to the any other apparatus for recording and reproducing data while rotating a disk recording medium by the spindle motor, such as a floppy disk drive apparatus, an optical disk apparatus, etc.

Besides these, many modifications and variations of the above embodiments may be made without departing from the novel and advantageous features of the present invention. Accordingly, all such modifications and variations are intended to be included within the scope of the appended claims.

What is claimed is:

1. An apparatus for recording and reproducing data, comprising:

head means for recording and reproducing data with respect to a disk recording medium;

a rotational driving mechanism including a spindle motor for driving the disk recording medium in rotation according to a driving waveform; and waveform correction means for detecting vibration of the rotational driving mechanism, including vibration in any direction other than a direction of rotational vibration around a rotational axis of the spindle motor, and correcting the driving waveform supplied to the rotational driving mechanism according to the detected vibration.

2. The apparatus of claim 1, wherein the waveform correction means includes:

error detection means for detecting an error in a rotational speed of the spindle motor;

first correction signal generation means for generating a first correction signal for correcting the rotational speed of the spindle motor according to the error detected by the error detection means;

vibration part analysis means for analyzing a vibration part of the rotational driving mechanism contained in the error detected by the error detection means;

second correction signal generation means for generating a second correction signal for suppressing the vibration part analyzed by the vibration part analysis means; and means for producing a corrected waveform according to a sum of the first correction signal and the second correction signal and supplying the corrected waveform as the driving waveform to the rotational driving mechanism.

3. The apparatus of claim 2, wherein the second correction signal generation means generates the second correction signal having an identical amplitude and an opposite phase as each frequency component of the vibration part analyzed by the vibration part analysis means.

4. The apparatus of claim 3, wherein the vibration other than rotational vibration includes an axial vibration of the spindle motor.

5. The apparatus of claim 1, wherein the waveform correction means includes:

error detection means for detecting an error in a rotational speed of the spindle motor;

first correction signal generation means for generating a first correction signal for correcting the rotational speed of the spindle motor according to the error detected by the error detection means;

vibration detector means for directly detecting the vibration of the rotational driving mechanism;

vibration part analysis means for analyzing a vibration part of the rotational driving mechanism from the vibration detected by the vibration detector means;

second correction signal generation means for generating a second correction signal for suppressing the vibration part analyzed by the vibration part analysis means; and means for producing a corrected waveform according to a sum of the first correction signal and the second correction signal and supplying the corrected waveform as the driving waveform to the rotational driving mechanism.

6. The apparatus of claim 5, wherein the second correction signal generation means generates the second correction signal having an Identical amplitude and an opposite phase as each frequency component of the vibration part analyzed by the vibration part analysis means.

7. The apparatus of claim 1, wherein the waveform correction means corrects the driving waveform by composing a reference driving waveform obtained from a rotational position of the spindle motor and a correction waveform obtained from the vibration of the rotational driving mechanism.

8. A method of recording and reproducing data, comprising the steps of:

(a) recording and reproducing data with respect to a disk recording medium through head means;

(b) driving the disk recording medium in rotation according to a driving waveform by a rotational driving mechanism including a spindle motor; and (c) detecting vibration of the rotational driving mechanism, including vibration in any direction other than a direction of rotational vibration around a rotational axis of the spindle motor, and correcting the driving waveform supplied to the rotational driving mechanism according to the detected vibration.

9. The method of claim 8, wherein the step (c) includes the steps of:

(c1) detecting an error in a rotational speed of the spindle motor;

(c2) generating a first correction signal for correcting the rotational speed of the spindle motor according to the error detected at the step (c1);

(c3) analyzing a vibration part of the rotational driving mechanism contained in the error detected at the step (c1);

(c4) generating a second correction signal for suppressing the vibration part analyzed at the step (c3); and (c5) Producing a corrected waveform according to a sum of the first correction signal and the second correction signal generated at the steps (c2) and (c4), and supplying the corrected waveform as the driving waveform to the rotational driving mechanism.

10. The method of claim 9, wherein the step (c4) generates the second correction signal having an identical amplitude and an opposite phase as each frequency component of the vibration part analyzed at the step (c3).

11. The method of claim 10, wherein the vibration other than rotational vibration includes an axial vibration of the spindle motor.

12. The method of claim 8, wherein the step (c) includes the steps of:

(c1') detecting an error in a rotational speed of the spindle motor;

(c2') generating a first correction signal for correcting the rotational speed of the spindle motor according to the error detected at the step (c1');

(c3') directly detecting the vibration of the rotational driving mechanism;

(c4') analyzing a vibration part of the rotational driving mechanism from the vibration detected at the step (c3');

(c5') generating a second correction signal for suppressing the vibration part analyzed at the step (c4'); and (c6') producing a corrected waveform according to a sum of the first correction signal and the second correction signal generated at the steps (c2') and (c5'), and supplying the corrected waveform as the driving waveform to the rotational driving mechanism.

13. The method of claim 12, wherein the step (c5') generates the second correction signal having an identical amplitude and an opposite phase as each frequency component of the vibration part analyzed at the step (c4').

14. The method of claim 8, wherein the step (c) corrects the driving waveform by composing a reference driving waveform obtained from a rotational position of the spindle motor and a correction waveform obtained from the vibration of the rotational driving mechanism.

* * * * *